United States Patent [19]

Yasui et al.

[11] Patent Number: 4,892,165

[45] Date of Patent: Jan. 9, 1990

[54] FRAME CONSTRUCTION FOR SMALL SNOWMOBILE

[75] Inventors: Toshihiro Yasui; Masanori Sugita, both of Iwata, Japan

[73] Assignee: Yamaha Hatsudoki Kabushiki Kaisha, Iwata, Japan

[21] Appl. No.: 162,733

[22] Filed: Mar. 1, 1988

[51] Int. Cl.⁴ .............................................. B62M 27/00
[52] U.S. Cl. .................................... 180/190; 280/788; 280/798
[58] Field of Search ................ 180/190; 280/669, 788, 280/798

[56] References Cited

U.S. PATENT DOCUMENTS

| | | | |
|---|---|---|---|
| 3,871,460 | 3/1975 | Dehnert | 180/190 |
| 3,877,535 | 4/1975 | Gorski | 180/190 |
| 4,620,604 | 11/1986 | Talbot | 180/190 |
| 4,667,765 | 5/1987 | Tomoyuki | 280/798 |

*Primary Examiner*—Kenneth R. Rice
*Attorney, Agent, or Firm*—Ernest A. Beutler

[57] ABSTRACT

A small snowmobile embodying a light weight welded up tubular frame assembly that has a generally open configuration for facilitating servicing and which is the nevertheless extremely robust.

7 Claims, 4 Drawing Sheets

FRAME CONSTRUCTION FOR SMALL SNOWMOBILE

BACKGROUND OF THE INVENTION

This invention relates to a frame construction for a small snowmobile and more particularly to a light weight, relatively open and yet extremely rigid frame for such vehicles.

There is a need for a light weight, highly maneuverable snowmobile that can accommodate primarily a single rider. Such a snowmobile should incorporate a frame construction that has high rigidity but which can be of light weight construction. Conventional snowmobiles employ frames that are made up of heavy steel stampings that are welded together. Such stampings are not only expensive, but the welding operation adds to the cost and complexity. In addition, the components of such snowmobiles are quite concealed and are not readily available for servicing.

It is, therefore, a principal object of this invention to provide an improved, light weight, easily manufactured and low cost frame for a snowmobile.

It is a further object of this invention to provide a snowmobile frame that has a generally open construction so that the mechanical components of the snowmobile can be easily accessed for servicing.

It is a further object of this invention to provide such a light weight, open frame construction which nevertheless offers protection for the running components.

SUMMARY OF THE INVENTION

This invention is adapted to be embodied in a frame construction for a snowmobile which is comprised of a frame assembly consisting of a plurality of interconnected tubular members defining a generally open light weight construction. The frame defines a generally open engine area adapted to contain and support a driving engine. In addition, there is a rearwardly extending portion that is adapted to accommodate and suspend a driving track driven by the engine. The frame assembly further provides mounting means for mounting a body in overlying relationship to the frame assembly and a seat for the rider.

DETAILED DESCRIPTION OF THE PREFERRED EMBODIMENT OF THE INVENTION

Figure 1:
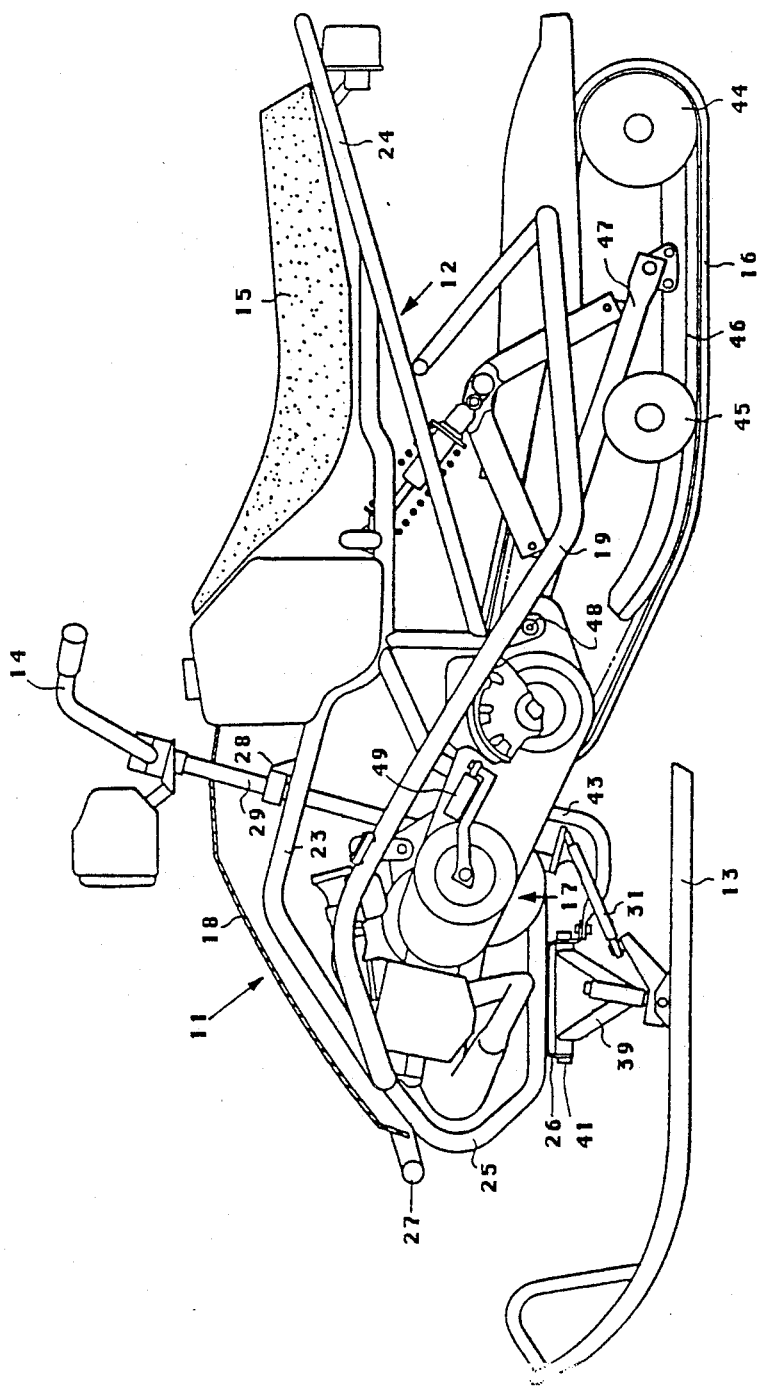
FIG. 1 is a side elevational view of a small snowmobile constructed in accordance with an embodiment of the invention, with a portion of the body broken away to more clearly show the construction.
Figure 2:
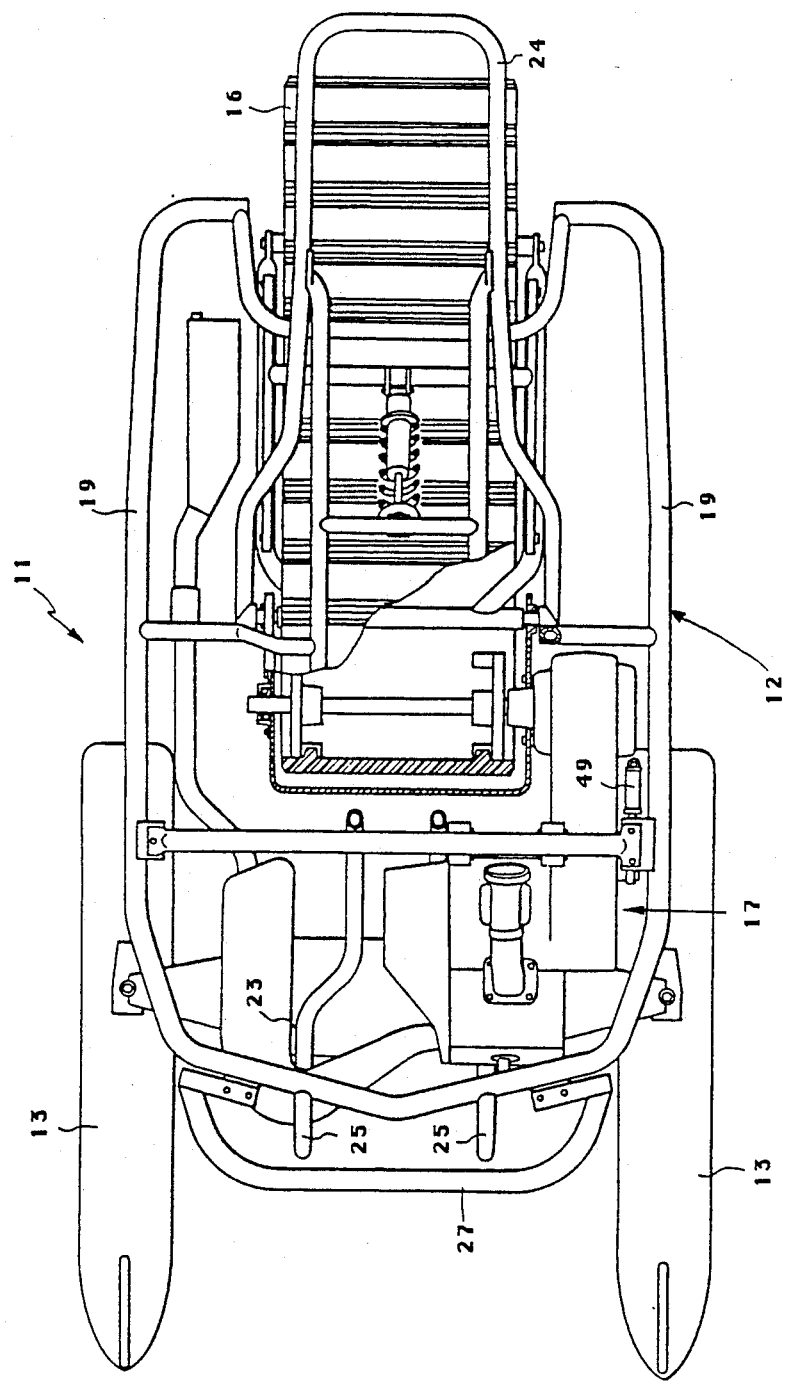
FIG. 2 is a top plan view of the snowmobile with the body and seat removed and a portion of the drive belt broken away.

Referring now in detail to the drawings and primarily initially to FIGS. 1 and 2, a small snowmobile constructed in accordance with an embodiment of the invention is indicated generally by the reference numeral 11. The snowmobile 11 is comprised of a frame assembly 12 which is of the tubular welded up type and which dirigibly supports a pair of front skis 13 at its forward end in a manner to be described. The skis 13 are steered also in a manner to be described by a handlebar assembly 14 that is positioned on the frame 12 forwardly of a seat 15. The snowmobile and specifically the seat 15 is configured so as to accommodate a single rider.

A drive belt 16 is positioned beneath the seat 15 and is driven by a power unit, indicated generally by the reference numeral 17. The power unit 17 is mounted within the frame 12 and drives the belt 16 in a manner as described in the copending application entitled "Engine Mounting and Drive Arrangement for Small Snowmobile." Ser. No. 162179, filed 2-29-88, in the name of Toshihiro Yasui. A body, indicated generally by the reference numeral 18 is supported upon the frame 12 and overlies the power unit 17.

Referring now additionally to the remaining figures, the frame 12, as has been previously noted, is of the welded up tubular type. The frame 12 is comprised of a first formed frame member 19 that forms generally an outer perimeter of the frame 12. The frame membr 19 may be formed from one or a plurality of tubes and carries mounting pads 21 at outwardly extending sides that are adapted to accommodate the feet of a rider seated on the seat 15. In additon, a forwardly positioned mounting pad 22 is provided at the forward end of the frame member 19.

The frame further includes a pair of inner tubular frame members 23 which extend inwardly of the perimeter member 19 from its front end to a rear seat rail portion 24. The seat rail portion 24 is comprised of a separate tube or tubes. In addition, a pair of down tubes 25 are connected to the forward ends of the perimeter frame member 19 and extend rearwardly and are connected at their rear ends to the inner frame members 23. The down tubes 25 carry an inverted channel shape member 26 that supports the front suspension system for the skis 13 in a manner to be described.

A separate grab bar 27 is affixed by bolting to the forward end of the perimeter frame member 19. As may be readily seen from the figures, the frame 12 includes a number of other reinforcing members than those described and the actual configuration of the frame 12 itself may be varied to suit desired applications.

A box like reinforcing structure 28 is connected to the inner frame members 23 forwardly of the seat 15. This box like member 28 journals a steering shaft 29 to which the handlebar assembly 14 is connected. The lower end of the steering shaft 29 is connected to the skis 13 by means of tie rods 31 for the steering of the skis.

Figure 3:
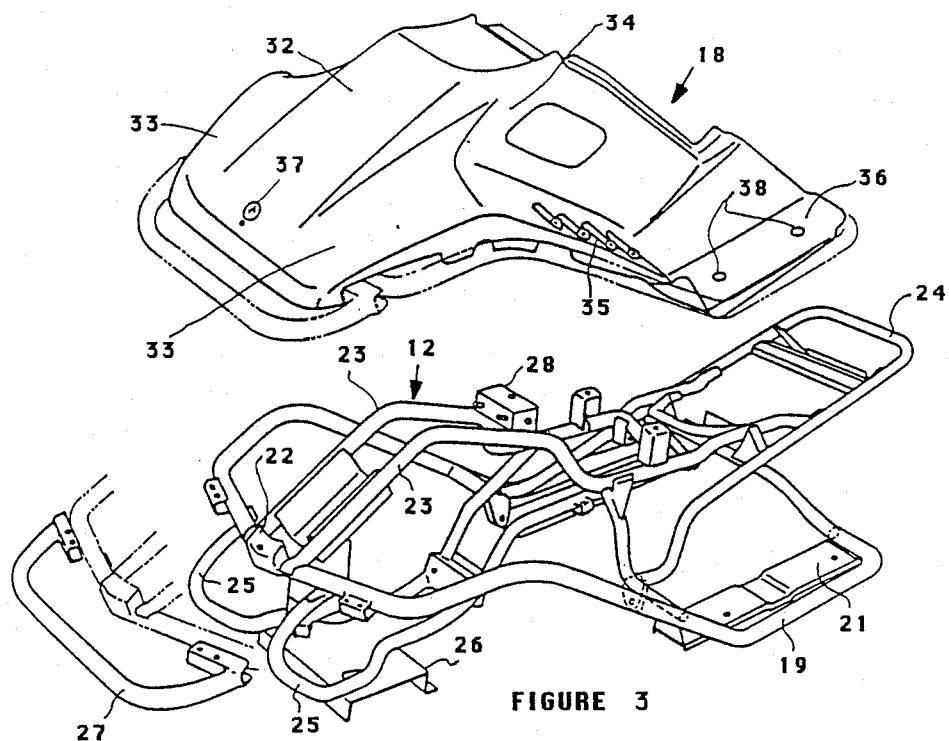
FIG. 3 is an exploded perspective view of the frame and body.
Figure 4:
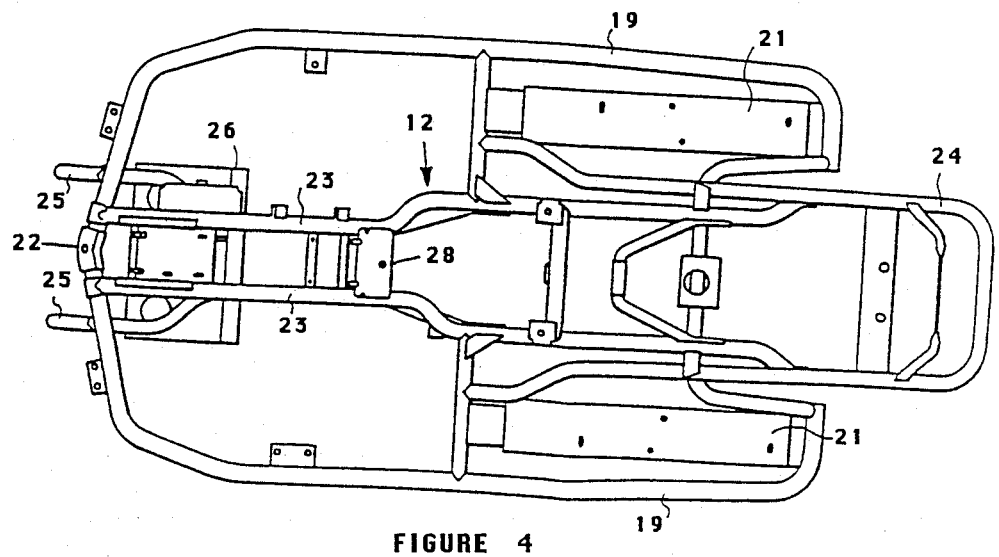
FIG. 4 is a top plan view of the frame.
Figure 5:
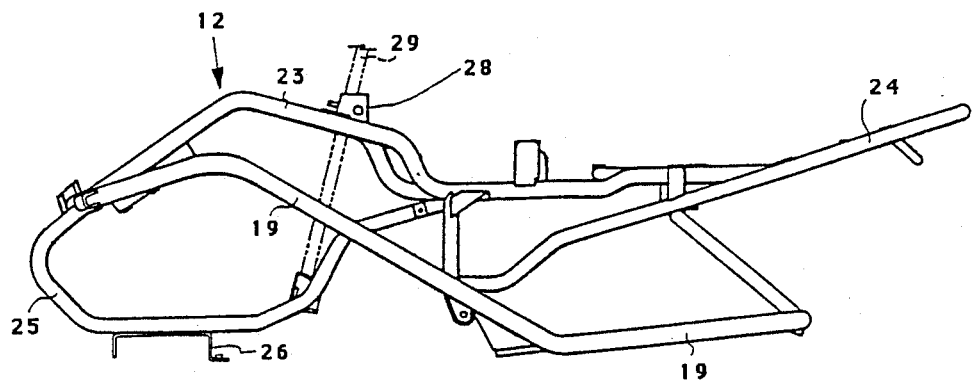
FIG. 5 is a side elevational view of the frame.

Referring now primarily to FIG. 3, the body 18 is formed of moulded fiberglass and, as has been previously noted, has a generally inverted cup shape. The body 18 is provided with a central cowl portion 32 that is defined between a pair of fender like portions 33. The portions 33 extend first upwardly and then taper downwardly on oppositely facing sides 34 of the cowl portion. The downwardly extending parts are formed with ridges 35 for stiffening and to accommodate the rider's feet if he so desires. In addition, the side portions 33 end in horizontally extending portions 36 that overlie the attaching plates 21.

It should be noted that the front of the cowl portion 32 is formed with an opening 37 while the foot portions 36 are formed with openings 38. These respective openings 37 and 38 are adapted to pass quick disconnect fasteners which cooperate with corresponding parts on the mounting pads 22 and 21, respectively, for readily detaching the body 18 to the frame assembly 12. It should be noted that this attachment and disconnection can be easily accomplished by merely lifting the body 18 vertically upwardly relative to the frame assembly for ease of insertion and removal for servicing of the running components positioned beneath the body 18 and which will now be described.

Figure 6:
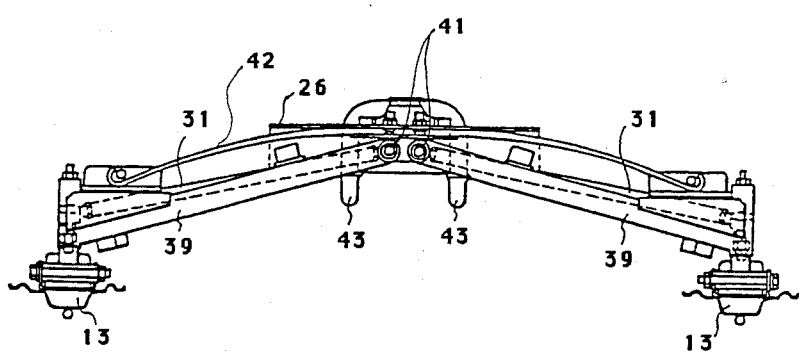
FIG. 6 is a front view of the suspension arrangement for the snowmobile and its mounting to the frame.

The suspension system for the front skis 13 may be best understood by reference to FIGS. 1 and 6 and is comprised of a pair of A arms 39 that are pivotally connected at their inner ends to the channel shape member 26 by means of pivot shafts 41. A transversely extending single leaf spring 42 is engaged at its outer ends with the respective A arms 39 and is retained at its mid point in the channel shape member 26 in an appropriate manner for suspending the front skis 13.

A pair of generally U shaped frame members 43 are affixed to the frame assembly 12 and form a portion of it. These members 43 are disposed so as to be in a location to protect the tie rods 31 from damage when traveling over rough terrain. In addition, the members 43 strengthen the frame in the area where the A arm pivot shafts 41 are located. As a result, the frame construction is extremely robust and nevertheless offers a very compact light weight and generally open configuration so as to service the components of the snowmobile 11.

The rear track 16 is supported by a main idler pulley 44 and a pair of forward idler pulleys 45 that are carried by a guide rail assembly 46. The guide rail assembly 46 is, in turn, suspended by means of a pair of trailing arms 47 that are pivotally connected to the guide rails 46 and pivotally connected to the frame at their forward end by a pivot pin 48.

As has been previously noted, a single rider is adapted to be accommodated on the seat 15 and may place his feet on either the body portions 36 or the inclined body portions where the ribs 35 are formed. In order to facilitate starting, a kick starter 49 is connected to the engine output shaft in the manner described in copending application entitled "Engine Mounting Arrangement for Small Snowmobile," Ser. No. 162179, filed 2-29-88, in the name of Toshihiro Yasui et al.

As has been noted, the described frame construction is of a very light weight and open construction so as to facilitate servicing of the components. however, because of the configuration of the frame and the interconnection of the tubular members in the manner described the frame is extremely robust. In addition, a very simple yet highly effective and well protected suspension is accommodated for the front skis.

It is to be understood that the foregoing description is that of a preferred embodiment of the invention and that various changes and modifications may be made without departing from the spirit and scope of the invention, as defined by the appended claims.

We claim:

1. A snowmobile construction comprised of a frame assembly, said frame assembly comprising a plurality of interconnected tubular members defining a generally open, light weight construction, said frame defining a generally open engine area adapted to contain and support a driving engine, said frame further having a rearwardly extending portion adapted to accommodate and suspend a driving track driven by the engine, said frame assembly further providing mounting means for mounting a body and a body carried said mounting means in overlying relationship to only the forward portion of said frame assembly and closing only the upper part of said open engine area, and a seat for a rider mounted directly on said frame assembly and behind and independently of said body.

2. A snowmobile construction as set forth in claim 1 wherein the frame is provided with outwardly extending portions accommodating foot rests on opposite sides of the seat.

3. A frame construction for a snowmobile comprised of a frame assembly, said frame assembly comprising a plurality of interconnected tubular members defining a generally open, light weight construction, said frame defining a generally open engine area adapted to contain and support a driving engine, said frame further having a rearwardly extending portion adapted to accommodate and suspend a driving track driven by the engine, said frame assembly further providing mounting means for mounting a body in overlying relationship to said frame assembly and for mounting a seat for a rider, outwardly extending portions accommodating foot rests on opposite sides of the seat defined by a perimeter frame tube, down tubes affixed to the perimeter frame tube and extending downwardly and rearwardly therefrom, and a seat rail extending rearwardly from said perimeter tube and to which said down tubes are affixed.

4. A frame construction as set forth in claim 3 further including a pair of inner tubular members affixed to the forward end of said perimeter frame tube and extending upwardly and rearwardly therefrom and merging into the seat rail.

5. A frame construction as set forth in claim 4 further including a channel shape member affixed to said down tubes and carrying the front skis.

6. A frame construction as set forth in claim 5 wherein the channel shape member pivotally supports a pair of A arms for suspending the front skis.

7. A frame construction as set forth in claim 6 further including reinforcing members affixed to said channel shape member and overlying and protecting the steering mechanism for the front skis.

* * * * *